United States Patent [19]

Son et al.

[11] Patent Number: 5,739,977
[45] Date of Patent: Apr. 14, 1998

[54] POLE BASE MOVING APPARATUS OF TAPE RECORDER

[75] Inventors: Byung-sam Son; Yong-chae Jeong; Myoung-sub Jang, all of Suwon; Chung-ung Kim, Seoul, all of Rep. of Korea

[73] Assignee: Samsung Electronics Co., Ltd., Kyungki-do, Rep. of Korea

[21] Appl. No.: 774,358

[22] Filed: Dec. 27, 1996

[30] Foreign Application Priority Data

Mar. 29, 1996 [KR] Rep. of Korea ............ 96-9186

[51] Int. Cl.$^6$ ............ G11B 15/665; G11B 15/61
[52] U.S. Cl. ............ 360/85; 360/95
[58] Field of Search ............ 360/84, 85, 95

[56] References Cited

U.S. PATENT DOCUMENTS

| | | | |
|---|---|---|---|
| 4,015,292 | 3/1977 | Kim | 360/95 X |
| 4,388,658 | 6/1983 | Kajino et al. | 360/85 |
| 4,408,236 | 10/1983 | Murata et al. | 360/85 |
| 4,697,215 | 9/1987 | Hata | 360/95 |
| 4,872,075 | 10/1989 | Yamaguchi et al. | 360/85 |
| 5,200,865 | 4/1993 | Yoon | 360/85 |
| 5,475,546 | 12/1995 | Choi | 360/85 |
| 5,636,079 | 6/1997 | Choi | 360/85 |

*Primary Examiner*—Stuart S. Levy
*Assistant Examiner*—William J. Klimowicz
*Attorney, Agent, or Firm*—Sughrue, Mion, Zinn, Macpeak & Seas, PLLC

[57] ABSTRACT

A pole base moving apparatus of a tape recorder in which the link structure of a pole base which pulls out a magnetic tape from a tape cassette to a head drum is provided. The pole base moving apparatus includes a slide member which has a reciprocating motion produced by a motor and in which moving slots of a predetermined pattern are formed and first and second link members whose one ends are respectively combined with a pair of pole bases and the other ends of which have protrusions which respectively enter and exit the moving slots. Accordingly, it is possible to simplify the structure compared with the conventional technology, thus simplifying the assembly process and reducing the number of the parts and manufacturing costs.

2 Claims, 7 Drawing Sheets

FIG. 7

POLE BASE MOVING APPARATUS OF TAPE RECORDER

BACKGROUND OF THE INVENTION

The present invention relates to a pole base moving apparatus of a tape recorder and, more particularly, to a pole base moving apparatus of a tape recorder in which a link structure of a pole base which pulls out a magnetic tape from a tape cassette to a head drum is improved.

Figure 1:
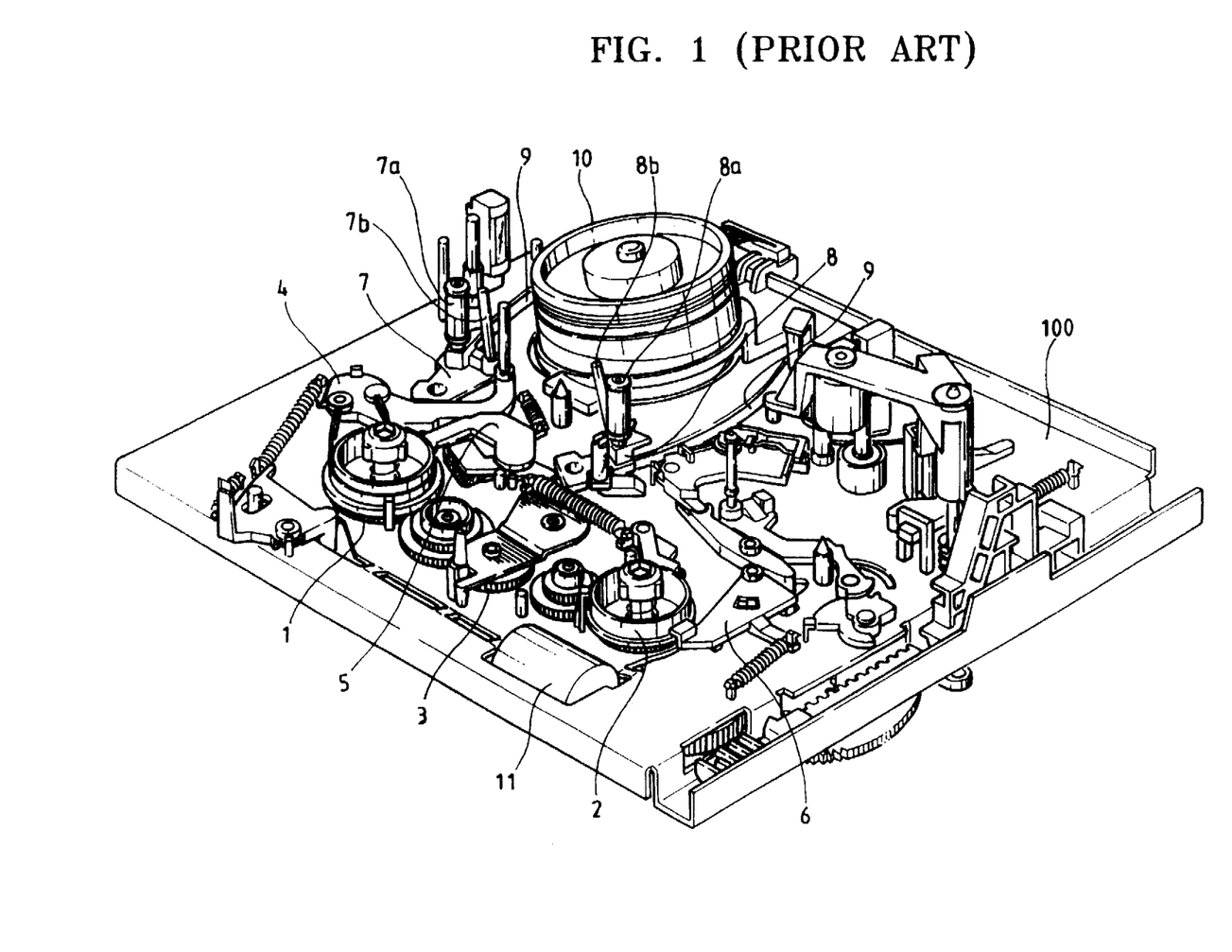
FIG. 1 is a perspective view showing the structure of a general tape recorder.

Referring to FIG. 1, in a general tape recorder, there are two reel tables 1 and 2 on which the reels of a tape cassette are seated and an idler 3 for selectively transmitting power to the respective reel tables 1 and 2 during a change of mode to PLAY, REV, REW, F.F., etc. Brake members 4, 5 and 6 for stopping the respective reel tables 1 and 2 during a change of mode are disposed around the reel tables 1 and 2.

Also, pole bases 7 and 8 slidingly installed on a deck 100 include guide rollers 7a and 8a for controlling the traveling height of the tape and inclination poles 7b and 8b for controlling the degree of inclination of the tape. The pole bases 7 and 8 pull out the tape of the cassette and bring the tape into contact with the circumference of a head drum 10, while being driven by a loading motor 11 and moving along the respective guide slots 9 formed in the deck 100.

Figure 2:
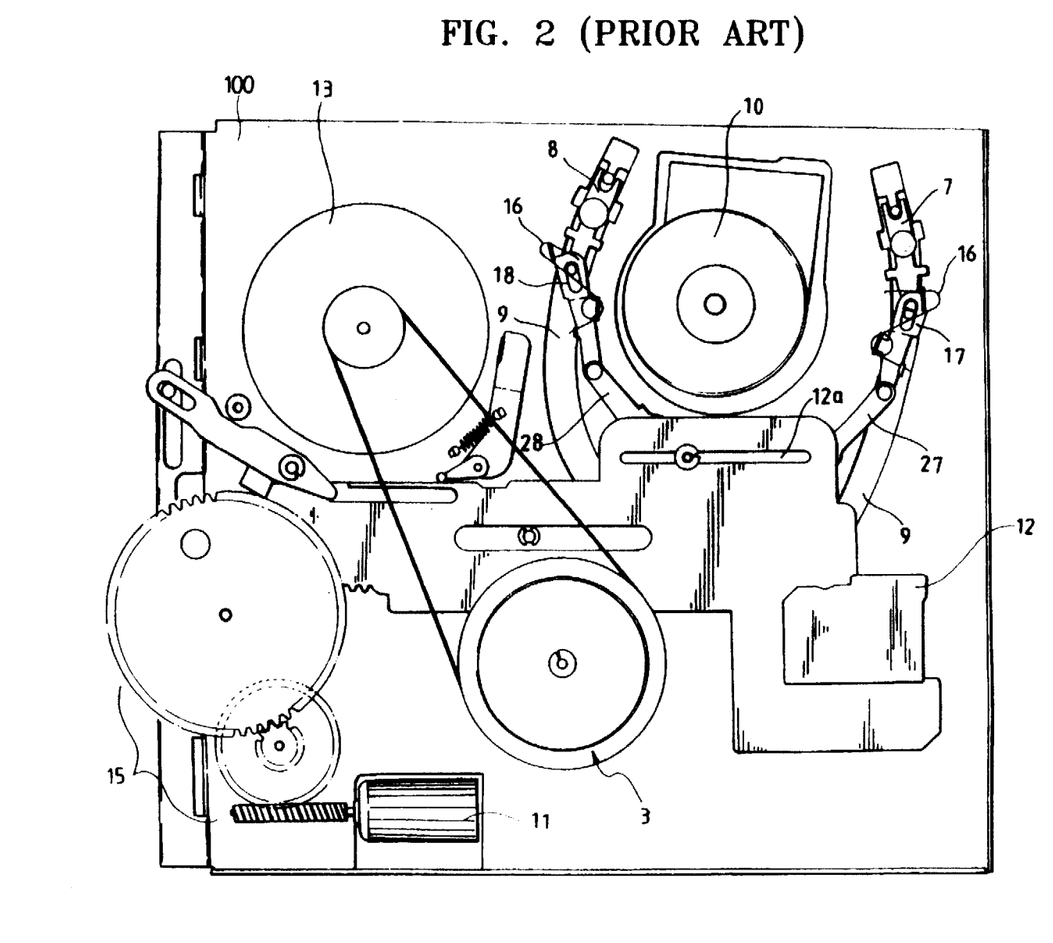
FIG. 2 is a plan view showing the structure of a lower surface of a deck of the tape recorder shown in FIG. 1.

Referring to FIG. 2, a slide member 12 for moving the pole bases 7 and 8 is provided on the lower surface of the deck 100. The slide member 12 meshes with a gear train 15, and the pole bases 7 and 8 are each combined with the slide member 12 by a three-link structure. Namely, there are provided first link members 27 and 28 combined with a sliding slot 12a formed in the slide member 12 and second link members 17 and 18 which connect the pole bases 7 and 8 to the first link members 27 and 28 and are elastically supported by springs 16. The pole bases 7 and 8, which each form a third link, move by the articular movement of the first and second link member 27, 28, 17 and 18. In FIG. 2, reference numeral 13 denotes a capstan motor for driving the idler 3.

Figure 3:
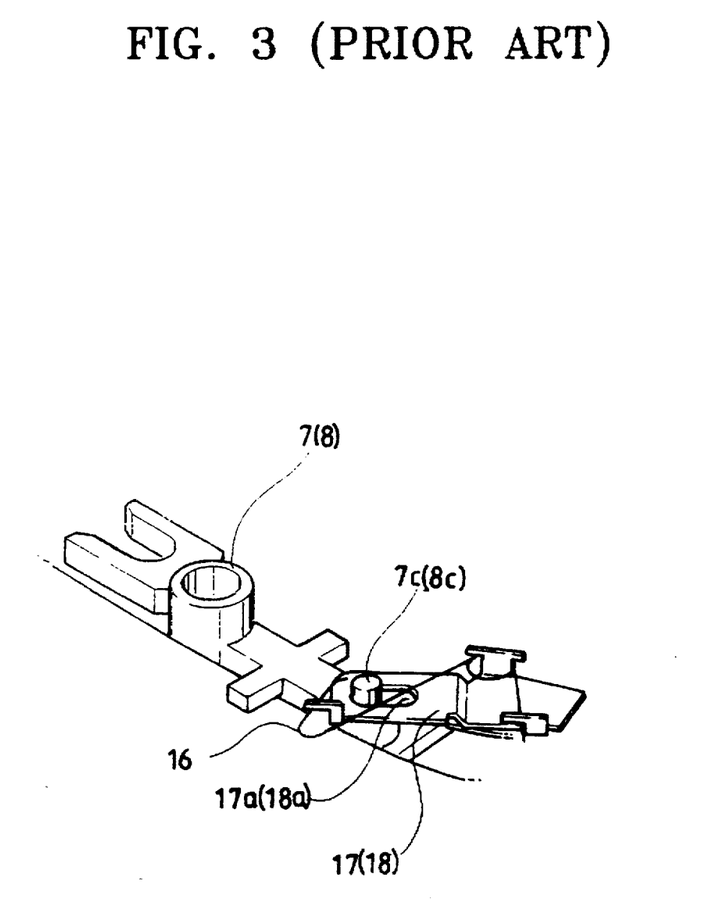
FIG. 3 is a partial perspective view showing a pole base link structure shown in FIG. 2.

The structure combining the pole bases 7 and 8 and the second link members 17 and 18 is described in greater detail in FIG. 3. As shown in FIG. 3, slot 17a (18a) is formed in the second link member 17 (18) and protrusion 7c (8c) which inserts therein and is elastically supported by a spring 16 is formed in one end of the pole base 7 (8).

Figure 4:
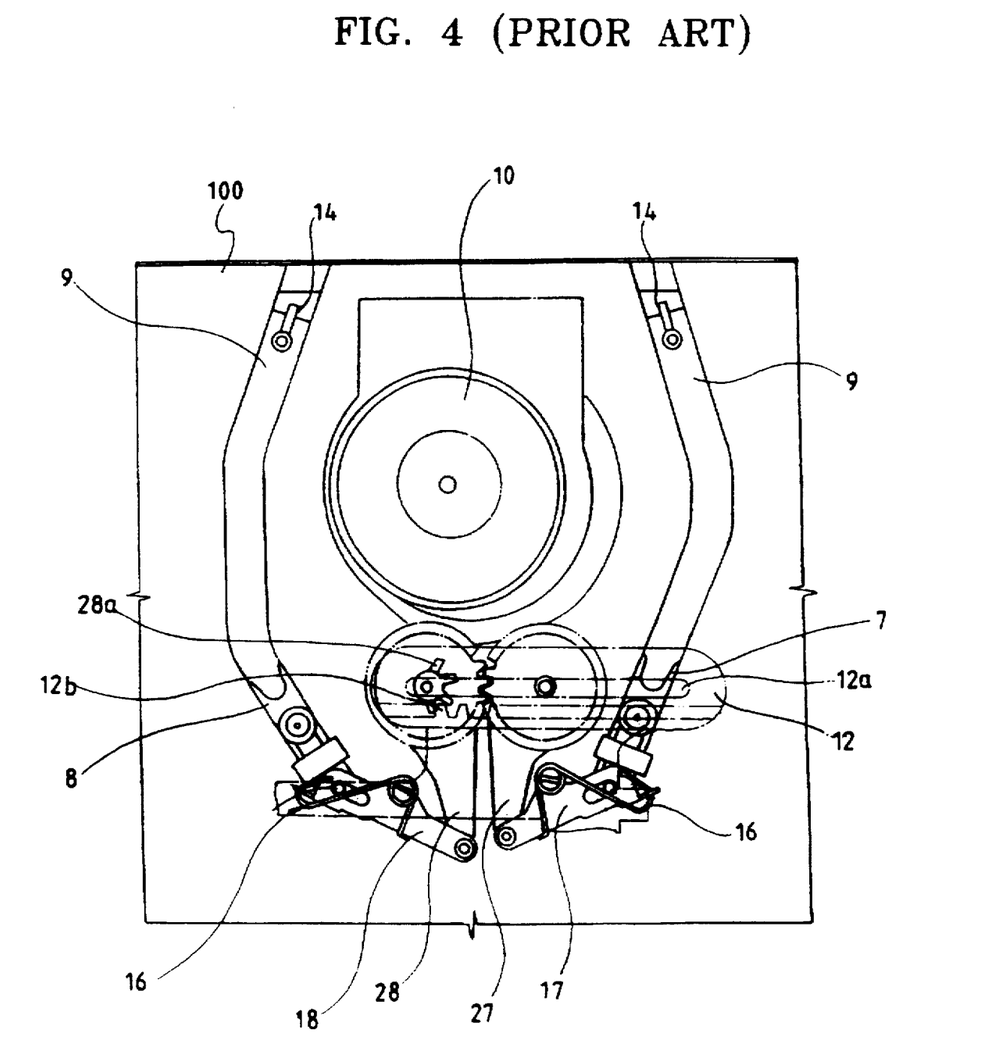
FIG. 4 is a plan view showing a pole base moving apparatus of a conventional tape recorder.

Referring to FIG. 4, a gear 28a which engages with a gear portion 12b formed in the slide member 12 is included in the first link member 28 combined to the sliding slot 12a of the slide member 12. Also, the first link members 27 and 28 gear-engage with each other.

The operation of a conventional pole base moving apparatus having such a structure is described with reference to FIGS. 2, 4 and 5.

When the loading motor 11 (FIG. 2) rotates, the slide member 12 which engages with the gear train 15 has a rectilinear motion in the right and left directions and the first link members 27 and 28 rotate due to the gear connection.

At this time, the second link members 17 and 18 combined with the first link members 27 and 28 articulately move and push the pole bases 7 and 8 to the upper side of the drawing along the respective guide slots 9 formed on the deck 100.

Figure 5:
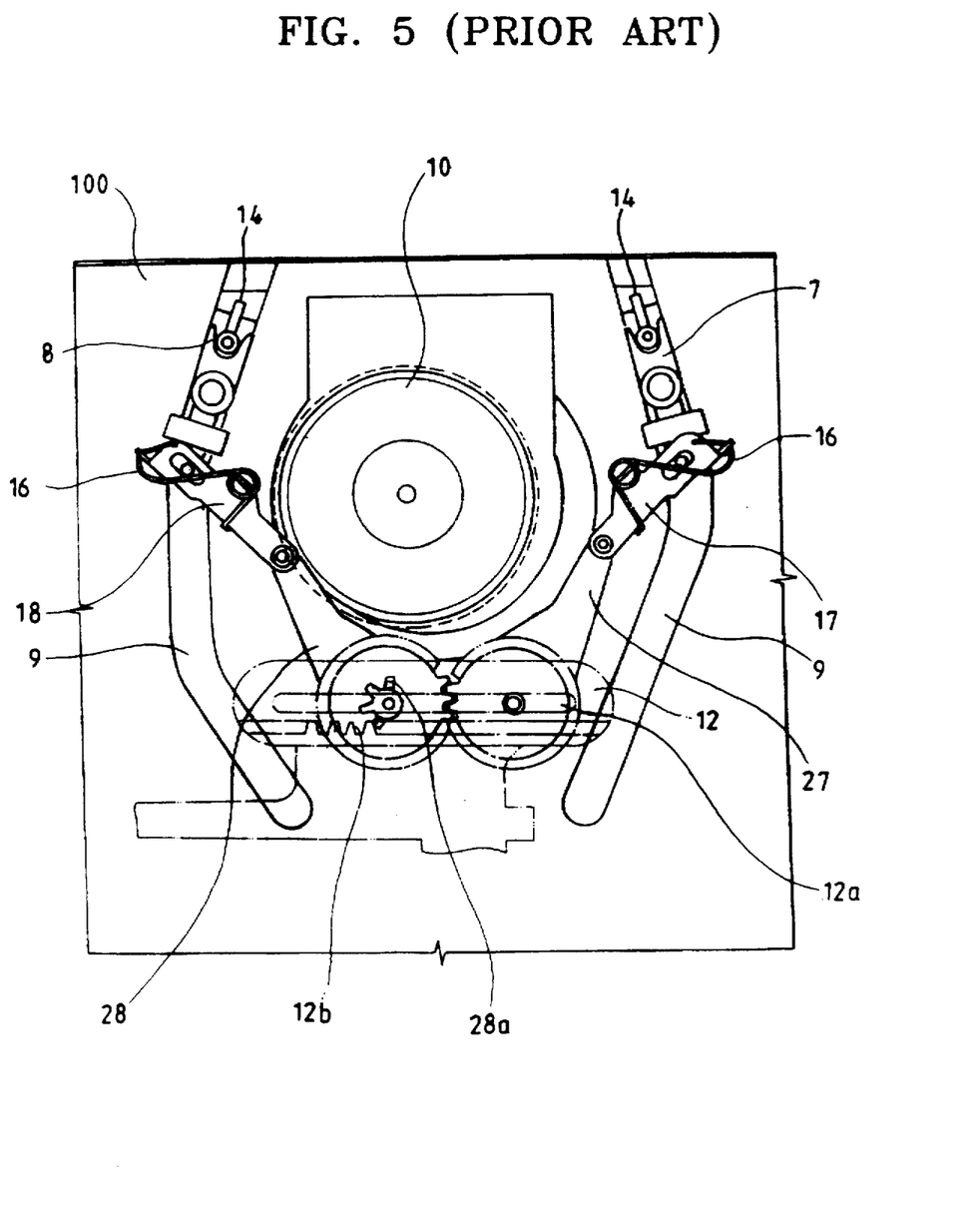
FIG. 5 is a plan view showing a loaded state of the pole base moving apparatus shown in FIG. 4.

The pole bases 7 and 8 continue to move until they are stopped by stoppers 14 installed at the ends of the guide slots 9 and, as shown in FIG. 5, come into a completely loaded state.

However, since the conventional pole base moving apparatus has first link members which are combined to the slide member and the second link members which connect the first link members to the pole bases in the right and left sides thereof, many parts and a complicated assembly process are required and the manufacturing costs of the tape recorder increases.

SUMMARY OF THE INVENTION

It is an object of the present invention to provide a pole base moving apparatus of a tape recorder by which it is possible to reduce the number of parts by improving a link structure which connects a slide member to a pole base and which reduces manufacturing costs by simplifying the assembly process.

To achieve the above object, there is provided a pole base moving apparatus, comprising a deck on which a head drum is installed and a pair of guide slots is formed on opposite sides of the head drum, first and second pole bases movably, respectively combined with the guide slots and formed with first and second protrusions, respectively, first and second link members whose one ends are rotatably connected to the first and second pole bases, respectively, the other ends of which respectively have third and fourth protrusions, and whose middle portions respectively have slots, first and second fixing pins which are fixedly installed on the deck and are respectively combined with the slots, and a slide member installed on the deck and having first and second moving slots respectively linked to the guide slots and to which the first and second protrusions of the first and second pole bases are movably combined, and third and fourth moving slots to and from which the third and fourth protrusions enter and exit, wherein when the slide member moves rectilinearly, the first and second protrusions respectively move along the first and second moving slots, the one ends of the first and second link members move up, the pole bases respectively exit from the first and second moving slots and ascend along the guide slots, the other ends of the first and second link members rotate centering around the first and second fixing pins, and the third and fourth protrusions are respectively inserted into the third and fourth moving slots.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE INVENTION

Figure 6:
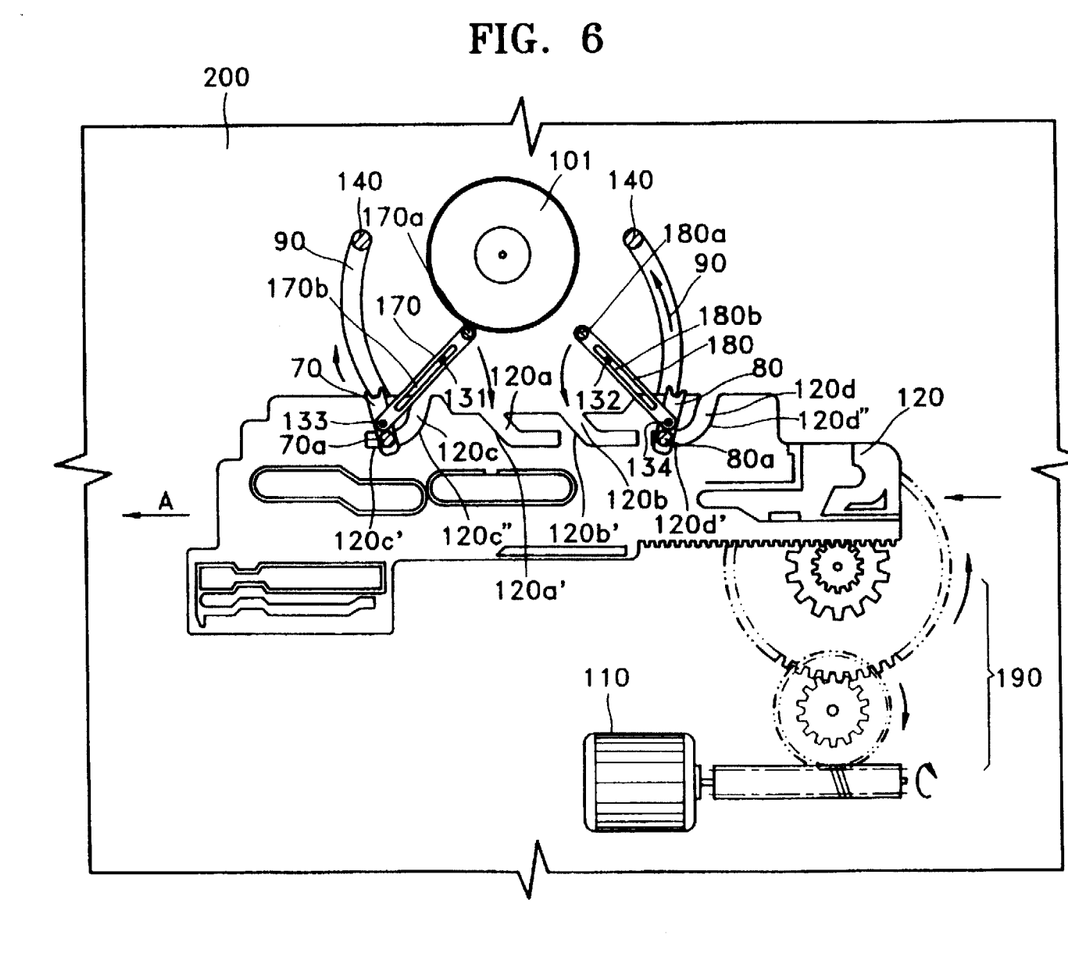
FIG. 6 is a plan view showing a pole base moving apparatus according to the present invention.

Referring to FIG. 6, a pole base moving apparatus of the present invention includes first and second pole bases 70 and 80 for pulling out a tape from a cassette and pulling the tape into contact with the circumference of a head drum 101 rotatably installed on a deck 200 and a moving means connected to the first and second pole bases 70 and 80, for moving and guiding the first and second pole bases 70 and 80.

The moving means includes a slide member 120 rectilinearly reciprocating by the rotation of a loading motor 110 and formed with first, second, third, and fourth moving slots 120c, 120d, 120a, and 120b of a predetermined form.

Also, guide slots 90 are formed on the deck 200 so as to guide the movement of the pole bases 70 and 80 by being extended from the first and second moving slots 120c and 120d. First and second link members 170 and 180 interlock with the slide member 120 and one end of each of the link members 170 and 180 connect to the first and second pole bases 70 and 80 by third and fourth fixing pins 133 and 134.

The first and second link members 170 and 180 are formed with slots 170b and 180b and rotatably combined to the deck 200 by inserting first and second fixing pins 131 and 132 in the slots 170b and 180b.

First and second protrusions 70a and 80a guided along the first and second moving slots 120c and 120d are formed on the first and second pole bases 70 and 80. Third and fourth protrusions 170a and 180a guided along the third and fourth moving slots 120a and 120b are provided on each of another end of the first and second link members 170 and 180.

Horizontal portions 120c' and 120d' in which the first and second protrusions 70a and 80a of the first and second pole bases 70 and 80 are guided, and inclination portions 120c" and 120d" linked to the guide slot 90 and inclined at a predetermined angle to the moving direction of the slide member 120 are included in the first and second moving slots 120c and 120d. Inclination portions 120a' and 120b' for guiding the insertion of the third and fourth protrusions 170a and 180a of the first and second link members 170 and 180 are included in the third and fourth moving slots 120a and 120b.

The operation of the pole base moving apparatus according to the present invention having the above structure is described with reference to FIGS. 6 and 7.

When the loading motor 110 shown in FIG. 6 rotates in a loading direction, a gear train 190 engaged with the loading motor 110 rotates and the slide member 120 which engages with the gear train 190 moves in the direction indicated by arrow A of the drawing.

Accordingly, the first protrusions 70a and 80a of the first and second pole bases 70 and 80 are guided along the first and second moving slots 120c and 120d formed in the slide member 120 and the first and second pole bases 70 and 80 move up towards the head drum 101.

At this time, the other ends of the first and second link members 170 and 180, each one end of which is combined to the first and second pole bases 70 and 80, move down and rotate around the first and second fixing pins 131 and 132 combined with the slots 170b and 180b.

Then, as the slide member 120 continues to move in the direction indicated by the arrow A, the first and second protrusions 70a and 80a of the first and second pole bases 70 and 80 escape from the first and second moving slots 120c and 120d formed in the slide member 120 and at the same time, the third and fourth protrusions 170a and 180a formed on the first and second link members 170 and 180 insert or enter into the third and fourth moving slots 120a and 120b of the slide member 120.

As the slide member 120 continues to move, the third and fourth protrusions 170a and 180a of the first and second link members 170 and 180 move up the inclination portion 120a' and 120b' of the third and fourth moving slots 120a and 120b and push the first and second pole bases 70 and 80 upward along the respective guide slots 90 formed in the deck 200.

The first and second pole bases 70 and 80 continue to move until they are stopped by stoppers 140 installed at the ends of the guide slots 90 and are completely loaded.

Figure 7:
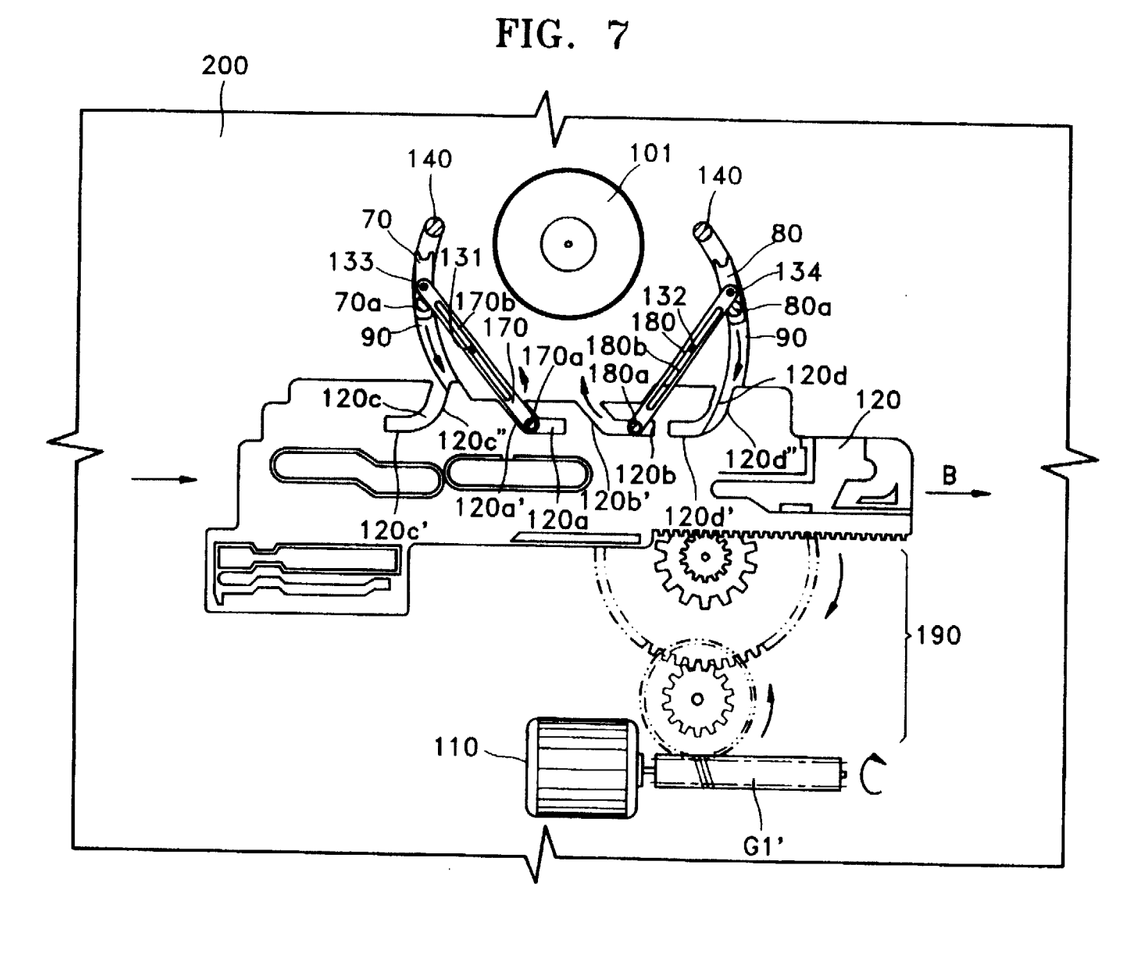
FIG. 7 is a plan view showing a loaded state of the pole base moving apparatus of the present invention shown in FIG. 6.

In case of unloading the pole bases, when the loading motor 110 rotates in the unloading direction as shown in FIG. 7, the slide member 120 moves in the direction indicated by arrow B.

Accordingly, as the third and fourth protrusions 170a and 180a of the first and second link members 170 and 180 are guided along the third and fourth moving slots 120a and 120b formed in the slide member 120, the other end of each of the first and second link members 170 and 180 moves up.

At this time, the one ends of the first and second link members 170 and 180 and the pole bases 70 and 80 combined by the third and fourth fixing pins 133 and 134 move down.

Then, as the slide member 120 moves, the third and fourth protrusions 170a and 180a of the first and second link members 170 and 180 escape from the third and fourth moving slots 120a and 120b formed in the slide member 120 and at the same time the first and second protrusions 70a and 80a formed on the first and second pole bases 70 and 80 insert or enter into the first and second moving slots 120c and 120d of the slide member 120.

As the slide member 120 continues to move, the first and second protrusions 70a and 80a of the first and second pole bases 70 and 80 pass along the inclination portions 120c" and 120d" of the first and second moving slots 120c and 120d and enter into the horizontal portions 120c' and 120d', thus the pole bases are completely unloaded.

The above mentioned pole base moving apparatus has a simplified structure compared to that of a conventional apparatus by employing a couple of link members which relay an operation between the slide member in which the moving slot is formed and the pole bases, thus simplifying the assembly process and reducing the number of parts and manufacturing costs.

It is contemplated that numerous modifications may be made to the pole base moving apparatus of the present invention without departing from the spirit and scope of the invention as defined in the following claims.

What is claimed is:

1. A pole base moving apparatus of a tape recorder, comprising:

a deck on which a head drum is installed and a pair of guide slots is formed on opposite sides of said head drum;

first and second pole bases movably, respectively combined with said guide slots and formed with first and second protrusions, respectively;

first and second link members whose one ends are rotatably connected to said first and second pole bases, respectively, other ends of which respectively have third and fourth protrusions, and whose middle portions respectively have slots;

first and second fixing pins which are fixedly installed on said deck and are respectively positioned within the slots of said first and second link members; and a slide member installed on said deck and having first and second moving slots respectively linked to said guide slots and to which said first and second protrusions of said first and second pole bases are movably combined, and third and fourth moving slots to and from which said third and fourth protrusions enter and exit, wherein when said slide member moves rectilinearly, said first and second protrusions respectively move along said first and second moving slots, the one ends of said first and second link members move up, said pole bases respectively exit from said first and second moving slots and ascend along said guide slots, the other ends of said first and second link members rotate centering around said first and second fixing pins, and said third and fourth protrusions are respectively inserted into said third and fourth moving slots.

2. The pole base moving apparatus of a tape recorder as claimed in claim 1, wherein said first and second moving slots have horizontal portions by which the first and second protrusions of said first and second pole bases are respectively guided and inclination portions which are respectively linked to said guide slots and inclined at a predetermined angle to the moving direction of said slide member, and wherein said third and fourth moving slots have inclination portions for respectively guiding the insertion of said third and fourth protrusions of said first and second link members.

* * * * *